United States Patent [19]

Ohmori

[11] Patent Number: 4,660,923

[45] Date of Patent: Apr. 28, 1987

[54] OPTICAL FIBER

[75] Inventor: Akira Ohmori, Ibaraki, Japan

[73] Assignee: Daikin Kogyo Co., Ltd., Japan

[21] Appl. No.: 843,810

[22] Filed: Mar. 27, 1986

Related U.S. Application Data

[63] Continuation of Ser. No. 711,091, Mar. 13, 1985, abandoned.

[30] Foreign Application Priority Data

Mar. 22, 1984 [JP] Japan .................. 59-55722

[51] Int. Cl.$^4$ .............................................. G02B 6/16
[52] U.S. Cl. ........................... 350/96.34; 526/245
[58] Field of Search ........... 350/96.34, 96.29, 96.30; 526/245

[56] References Cited

U.S. PATENT DOCUMENTS

| | | | |
|---|---|---|---|
| 3,386,977 | 6/1968 | Kleiner | 526/245 |
| 3,993,834 | 11/1976 | Chimura | 428/373 |
| 4,138,194 | 2/1979 | Beasley | 350/96.30 |
| 4,268,590 | 5/1981 | Eranian | 526/245 |

FOREIGN PATENT DOCUMENTS 113932 7/1983 Japan .

*Primary Examiner*—Christopher Henderson
*Attorney, Agent, or Firm*—Larson and Taylor

[57] ABSTRACT

The optical material of the present invention comprises a polymer which contains at least 70% by weight of a structural unit represented by the formula

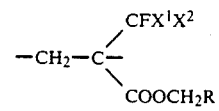

wherein $X^1$ and $X^2$ are the same or different and are each hydrogen or fluorine, and R is hydrogen, alkyl having 1 to 6 carbon atoms or fluoroalkyl having 1 to 6 carbon atoms.

3 Claims, No Drawings

OPTICAL FIBER

This application is a continuation, of application Ser. No. 711,091 filed Mar. 13, 1985, now abandoned.

This invention relates to an optical material comprising a fluorine-containing polymer.

Polymers prepared by polymerizing fluorine-containing methacrylic acid derivatives, such as fluoroalkyl methacrylate polymer, are known as plastics-type optical materials. However, since these polymers have a low softening point, they involve the following drawback. When they are used, for example, as the core material or cladding material for an optical fiber for transmission of light signals, the optical fiber is not durable for a prolonged period of time at high temperatures. Thus there is a demand for materials having a high heat resistance which can replace such polymers.

The main object of this invention is to provide an optical material comprising a polymer having a high softening point.

The object of the invention can be achieved by the use of a polymer as an optical material, the polymer containing at least 70% by weight of a structural unit represented by the formula

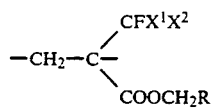

wherein $X^1$ and $X^2$ are the same or different and are each hydrogen or fluorine, and R is hydrogen, alkyl having 1 to 6 carbon atoms or fluoroalkyl having 1 to 6 carbon atoms.

The foregoing polymer can be prepared, for example, by polymerizing a monomer represented by the formula

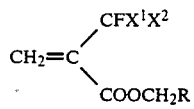 (a)

wherein $X^1$, $X^2$ and R are as defined above (e.g., the monomer as disclosed in "Organic Synthesis Chemistry," Vol. 19, No. 2, page 100), or by copolymerizing the monomer with at least one of other ethylenically unsaturated monomers.

Examples of other ethylenically unsaturated monomers are methacrylic acid, methacrylate, acrylic acid, acrylate, vinyl chloride, styrene, etc. Of these monomers, it is preferred to use methyl methacrylate, ethyl methacrylate, methacrylic acid or the like. The copolymers having so a high softening point as to meet the requirement for use must contain at least 70% by weight of the monomer represented by the formula (a).

The monomer of the formula (a) is generally polymerized by radical polymerization or anionic polymerization. In the case of radical polymerization, a polymer is prepared by block, solution, suspension or emulsion polymerization method. With radical polymerization, polymerization initiators useful for solution or suspension polymerization are azo compounds such as azobisisobutyronitrile and organic peroxides such as isobutyryl peroxide, octanoyl peroxide, di-isopropyl peroxy-dicarbonate and fluorine-containing organic peroxide of the formula $[Cl(CF_2CFCl)_2CF_2COO]_2$, $[H(CF_2CF_2)_3COO]_2$, $(ClCF_2CF_2COO)_2$ or the like. Polymerization initiators useful for emulsion polymerization are redox initiators comprising an oxidizing agent such as persulfate, a reducing agent such as sodium sulfite and a salt of transition metal such as ferric sulfate.

In block, solution or suspension polymerization, a chain transfer agent such as mercaptan can be used to adjust the distribution of molecular weight in the polymer. The chain transfer agent is used generally in an amount of 0.01 to 1 part by weight per 100 parts by weight of the monomer.

Examples of organic media useful for solution and suspension polymerization are fluorine-containing compounds such as $CCl_2F_2$, $CCl_2FCClF_2$, $CClF_2CClF_2$,

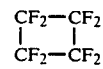

and the like and hydrocarbon compounds such as butyl acetate, methyl isobutyl ketone and the like.

The polymerization temperature in radical polymerization is suitably determined according to the decomposition temperature of the polymerization initiator, and generally ranges from 0 to 100° C.

The polymerization pressure in radical polymerization by any of these methods is generally in the range of 1 to 50 kg/cm$^2$ (absolute pressure).

Polymerization initiators for anionic polymerization include those commonly used in anionic polymerization such as alakli metal, metal hydride, sodium amide, Grignard's reagent, alkyl metal, pyridine, etc.

While feasible in the absence of a solvent as in radical polymerization, anionic polymerization can be conducted in the presence of an organic solvent. Examples of useful organic solvents are aromatic hydrocarbons such as toluene, ethers such as tetrahydrofuran, etc.

The polymerization temperature in anionic polymerization is generally in the range of $-100°$ to 30° C., preferably $-78°$ to 10° C.

The polymerization pressure in anionic polymerization is generally in the range of from 0.1 to 5 kg/cm$^2$ (absolute pressure).

The polymer obtained by radical or aninonic polymerization and useful as the optical material of the present invention has a molecular weight of about 200,000 to about 5,000,000, as measured by the gel permeation chromatography using polystyrene as a standard; a melt index of about 3 to 150 (in terms of gram) as measured by forcing out the polymer at 230° C. through a nozzle, 2.1 mm in inside diameter and 8 mm in length, with the piston under a load of 7 kg; a refractive index of about 1.30 to about 1.50; and a softening point of about 100 to about 150° C.

The optical materials of the present invention are advantageously usable for producing core materials and cladding materials for optical fibers, contact lenses, optical disk plates, organic glasses, etc. The polymers of this invention having a high refractive index are more suitable for preparing core materials for optical fibers, and those having a low refractive index are more suited for preparing cladding materials for optical fibers.

Given below are Comparison Example and Examples in which the optical materials of the present invention are used as cladding materials for optical fibers.

EXAMPLE 1

100 g of

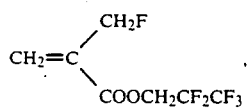

0.1 g of azobisisobutyronitrile and 0.05 g of dodecyl mercaptan were mixed together to obtain a solution. The solution was maintained at 70° C. for 12 hours to undergo block polymerization. The glass-like material thus obtained was dried under reduced pressure at 130° C. for 16 hours to give 93 g of a polymer. The polymer was found to have a melt index of 68.

The fibrous materials were processed at 230° C. into a composite yarn comprising a cladding of the polymer and a core of polymethyl methacrylate. The yarn was extended to 1.5 times its length at 180° C. to prepare an optical fiber having a diameter of 500 μm (with a cladding 25 μm in thickness).

The optical fiber thus obtained was found to have a transmission loss of 380 dB/km at a wavelength of 694 nm as measured by a remodelled type of Model FP-889 produced by Opelex Co, Ltd., United States. After the optical fiber was maintained at 100° C. for 100 hours, the transmission loss of the optical fiber at the same wavelength as above was determined in the same manner as above, and was 390 dB/km, namely little impaired in this property.

EXAMPLE 2

Polymerization was carried out in the same manner as in Example 1 except that

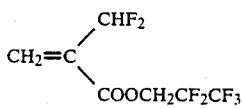

was used in place of

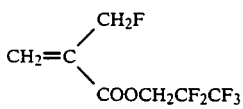

employed in Example 1. An optical fiber was prepared from the polymer thus produced (melt index: 82) and the transmission loss of the optical fiber thus obtained was measured, both in the same manner as in Example 1. The optical fiber was 340 dB/km in transmission loss at the same wavelength as in Example 1 and involved the same degree of transmission loss after it was left to stand at 100° C. for 100 hours.

EXAMPLE 3

100 g of

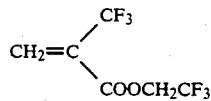

and 1 g of pyridine were mixed together to prepare a solution. The solution was maintained at 0° C. for 16 hours to undergo polymerization. The reaction product thus obtained was dissolved in acetone and the resulting solution was added dropwise to methanol to precipitate a glass-like material which was dried at 130° C. under reduced pressure for 16 hours to give 43 g of a polymer. The polymer was 140 in melt index.

An optical fiber prepared from the polymer by the same procedure as in Example 1 was 420 dB/km in transmission loss at the same wavelength as measured by the same method as in Example 1 and showed the same degree of transmission loss after it was heated at 100° C. for 100 hours.

EXAMPLE 4

100 g of

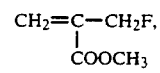

0.05 g of azobisisobutyronitrile and 0.05 g of dodecyl mercaptan were mixed together to obtain a solution. The solution was maintained at 0° C. for 12 hours to undergo block polymerization. The glass-like material thus obtained was dried under reduced pressure at 130° C. for 16 hours to give 81 g of a polymer. The polymer was found to have a melt index of 28.

The fibrous materials were processed at 230° C. into a composite yarn comprising a core of the polymer obtained above and a cladding of the polymer prepared in Example 1. The yarn was extended to 1.5 times its length at 180° C. to prepare an optical fiber having a diameter of 500 μm (with a cladding 25 μm in thickness).

When measured in the same manner as in Example 1, the transmission loss of the optical fiber produced above was 480 dB/km at the same wavelength. The optical fiber was maintained at 120° C. for 100 hours, and was 485 dB/km in transmission loss at the same wavelength as measured in the same manner as above, namely exhibited little deteriorated property in this respect.

COMPARISON EXAMPLE

Polymerization was effected in the same manner as in Example 1 with the exception of using

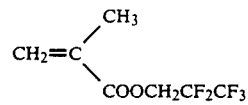

in place of the monomer used in Example 1. An optical fiber was produced from the polymer thus obtained (melt index: 48) and the transmission loss of the optical fiber was measured, both in the same manner as in Example 1.

While 440 dB/km in transmission loss at the same wavelength as measured immediately after preparation by the same method as in Example, the optical fiber displayed a seriously aggravated transmission loss of as high as 860 dB/km and contained a partially shrunken cladding, after it was heated at 100° C. for 100 hours.

I claim:

1. In an optical fiber comprising a cladding and a core, the improvement wherein said core comprises a polymer having at least 70% by weight of structural unit represented by the formula

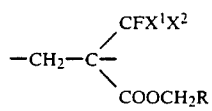

wherein $X^1$ and $X^2$ are the same or different and are each hydrogen or fluorine, and R is hydrogen, alkyl having 1 to 6 carbon atoms or fluoroalkyl having 1 to 6 carbon atoms.

2. The optical fiber of claim 1 wherein said core comprises a copolymer of a monomer having the formula

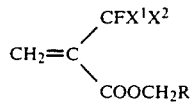

wherein $X^1$, $X^2$ and R as indicated above, with up to 30% by weight of another ethylenically unsaturated monomer.

3. An optical fiber as defined in claim 2 wherein the other ethylenically unsaturated monomer is at least one of methacrylic acid, methacrylate, acrylic acid, acrylate, vinyl chloride and styrene.

* * * * *